United States Patent [19]

Colston

[11] 4,216,467
[45] Aug. 5, 1980

[54] HAND CONTROLLER

[75] Inventor: John R. Colston, Annapolis, Md.

[73] Assignee: Westinghouse Electric Corp., Pittsburgh, Pa.

[21] Appl. No.: 863,204

[22] Filed: Dec. 22, 1977

[51] Int. Cl.² .......................... G06F 3/02; G05G 7/00
[52] U.S. Cl. ................................ 340/365 L; 73/133 R; 74/471 XY; 340/197; 414/4; 414/5; 414/6
[58] Field of Search .................. 340/177 R, 195, 197, 340/365 L; 73/133 R, 133 MC; 214/1 CM; 74/471, 471 XY; 244/83 E; 414/1-8

[56] References Cited

U.S. PATENT DOCUMENTS

| 3,331,972 | 7/1967 | Moller | 244/83 E |
|---|---|---|---|
| 3,350,956 | 11/1967 | Monge | 74/471 XY |
| 3,447,766 | 6/1969 | Palfreyman | 74/471 R |
| 3,561,280 | 2/1971 | MacPhee et al. | 74/471 XY |
| 3,654,549 | 4/1972 | Maurer et al. | 340/195 |
| 3,729,990 | 5/1973 | Oliver | 244/83 E |
| 3,904,042 | 9/1975 | Colston | 214/1 CM |

OTHER PUBLICATIONS

Stark Draper Laboratory, "Multi-moded Remote Manipulator System", Jan. 10, 1972.

Primary Examiner—John W. Caldwell, Sr.
Assistant Examiner—James J. Groody
Attorney, Agent, or Firm—Dean Schron

[57] ABSTRACT

A hand controller having a control handle member supported by a hexagonal array of three pairs of oppositely-angled force sensors provides for creation of control signals according to degree of input manual effort in any and all linear and rotary directions: left; right; up; down; fore; aft; forward; rearward; leftward and rightward; tilt moments; and clockwise and counterclockwise yaw moments.

5 Claims, 5 Drawing Figures

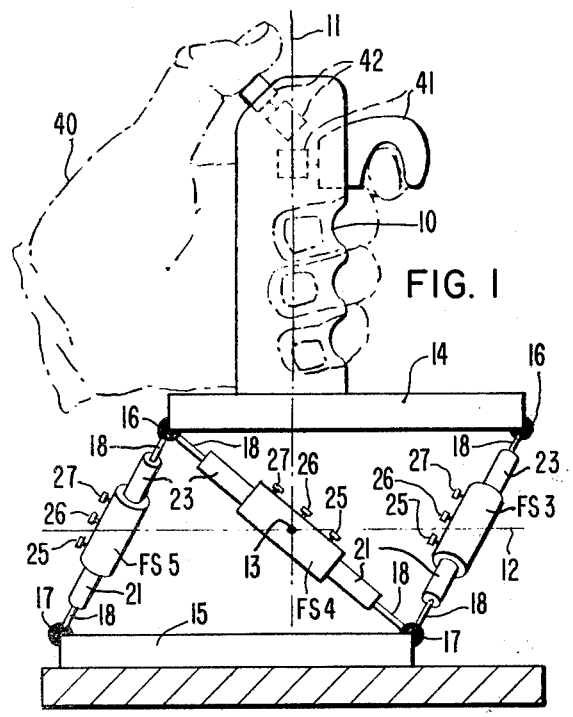
FIG. 1
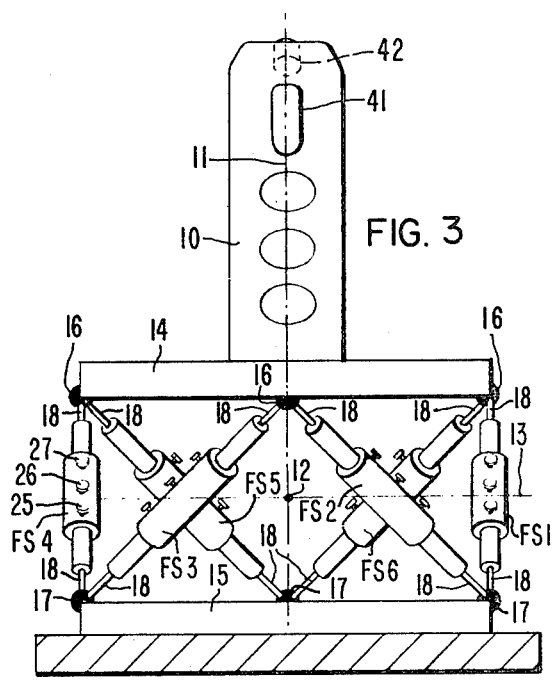
FIG. 3
FIG. 1A
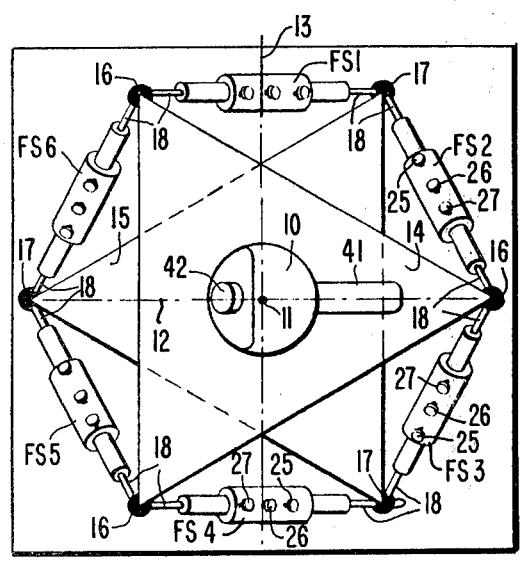
FIG. 2
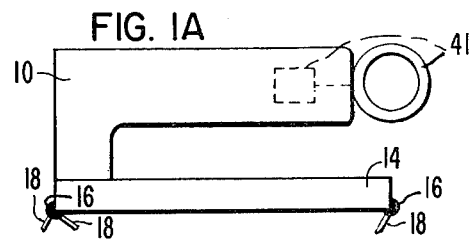
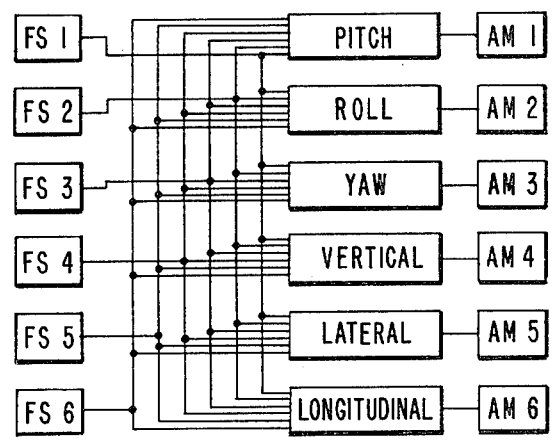
FIG. 5
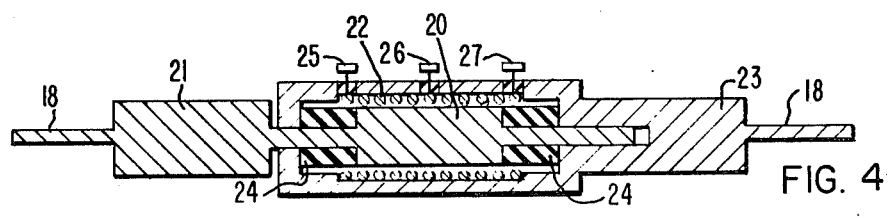
FIG. 4

HAND CONTROLLER

BACKGROUND OF THE INVENTION

1. Field of the Invention

An input-force-responsive hand controller device.

2. Description of the Prior Art

A hand controller that provides control signals according to input force applied to a handle, rather than according to gross movement of such handle, can offer advantages in terms of compactness and simplicity, particularly where such control handle effectuates force input to a considerable number of force sensors, as in control of a manipulator arm, for example, having six degrees of motion freedom, as in the system disclosed in U.S. Pat. No. 3,904,042 of the same inventor and assignee as the present patent application. The hand controller in this prior art patent is a stiff-jointed simplistic replica of the manipulator arm it is intended to control and offers opportunity for obviating any need for coordinate transformation between the signals generated by force sensors at the stiff spring joints in the hand controller and the input commands to the actuators in the manipulator arm joints.

SUMMARY OF THE INVENTION

The present invention provides a hand controller of the input-force-responsive type but is not necessarily a replica of any particular apparatus it is intended to control the operation of, manipulator arm, or undersea vehicle, for example. Its essence is simplicity in construction of the essential components and it employs a series of linear force sensor elements in angle direct supporting interposition between a handle member and a base member of such number and orientation as to enable response to input command forces in any of the mutually-perpendicular linear directions as well as any of the rotary directions about mutually perpendicular axes.

BRIEF DESCRIPTION OF THE DRAWINGS

FIGS. 1, 2, and 3 are side, top and end views of a schematic representation of a preferred embodiment of the force-responsive hand controller of the present invention and FIG. 1A illustrates an alternate handle arrangement of the controller;

FIG. 4 is a longitudinal section view of the exemplified form of force sensor employed in plurality in the hand controller device of the preceding figures; and FIG. 5 is a block diagram of a coordinate transformation system that may be employed with the hand controller of the present invention in one typical control system use.

DETAILED DESCRIPTION OF THE PREFERRED EMBODIMENT OF THE INVENTION

The hand controller device of the present invention is one capable of responding to manual force inputs applied to control handle 10 in each and all of three mutually-perpendicular linear directions relative to any one of three mutually-perpendicular axes 11, 12 or 13 as well as each and every one of three respective rotary directions about such axes. Whereas the control handle 10 has been shown in the drawings as extending vertically it should be understood that the device may be so oriented that the handle will extend in any other direction that the operator may find to be convenient. FIG. 1A illustrates one such variation wherein the handle 10 extends horizontally.

According to the invention, the handle 10 is rigidly attached to or connected with a handle member 14 that is rigid, conveniently may be planar and, as shown in the drawings, may be in the form of an equilateral triangle. Parallel to the handle member 14 is a rigid base member 15 that also may be planar and also may be in the form of an equilateral triangle as shown in the drawings. The centers of the triangular members 14 and 15 may be located along the common axis which preferably will coincide with the axis 11 which also may coincide with the central axis passing through the handle 10 and the two members 14 and 15 may be so aligned about their respective axes as to form a six pointed star as the one member is superimposed above the other member as shown in FIG. 2. The points of such six sided star then lie in a common circle about the axis 11 and are equally spaced apart. Extending between the handle member 14 and the base member 15 are six force sensors, FS1, FS2, FS3, FS4, FS5 and FS6 that are distributed equally around the members 14–15 assembly and are attached by bonds 16 at their upper ends to the apex points of the member 14 and at their lower ends are attached by bonds 17 to the apex ends of the base member 15. Each apex of the two members 14 and 15 has the ends of two force sensors bonded to it. The ends of each of the force sensors FS1 to FS6 that are bonded to the members 14 and 15 are in the form of small-diameter stiff flexible pivots in the form rods 18 for transmitting forces longitudinally along the central axes of the sensors while affecting a sufficient degree of bendability at their points of attachment with the members 14 and 15 as to provide the requisite slight degree of freedom of relative movement between these members sufficient to enable the force sensors FS1 to FS6 to recognize the force applied to the handle 10 relative to the base member 15. Each of the force sensors FS1 to FS6 includes a transducer therein that is capable of producing a signal indicative of the extent of longitudinal force exerted between its opposite ends and of the direction of such force, i.e., tension or compression.

In the illustrative embodiment as shown in FIG. 4 the force sensor 4 may embody a transducer of variable reluctance type as including a cylindrical core 20 of such as ferromagnetic material movable the requisite limited extent in unison with one end 21 of the force sensor within a cylindrical coil 22 mounted and constrained for relative movement with the opposite end 23 of such force sensor. The yieldable constraint imposed on such relative longitudinal movement between the two ends is afforded by such as washer member 24 of elastic material at opposite ends of the core member 20. The force intensity and directionality of signals may be picked off from the coil means 22 by three terminals 25, 26 and 27 connected to one end, the center, and the other end, respectively of such coil means; such terminals being located on the exterior of the force sensor to accommodate the interconnection into the requisite well-known bridge circuitry (not shown) that affords the utilization of such assembly as a force sensing signal producer, as will be readily understood by those versed in the art.

In operation the force sensors FS1 to FS6 of the hand controller device of the present invention in aggregate generate different combinations of signals according to the direction and nature of hand effort applied to handle 10 in any of the usual six degrees of direction freedom. The intensity of individual signals will vary according to the extent of effort applied to the handle 10 by virtue of the nature of the transducers employed in each of several force sensors. It will be apparent from FIG. 4, for example, that as the extent of thrust or tension introduced between the opposite ends 18 of any given sensor FS1 to FS6 varies, the extent of the position of the core 20 within the coil 22 also varies so that the assembly acts to indicate the extent of force realized by the sensors.

In the usual case, linear movement along the several of the three mutually-perpendicular axes 11, 12 and 13 will represent vertical, lateral and longitudinal movement and a turning movement about these axes will represent pitch, roll and yaw movement. Once the directional relationship of these several axes is recognized, then the hand controller can be made to control up to these six movements such as a power operated manipulator arm, an air-borne vehicle, an undersea vehicle, etc. In some cases a coordinate transformation means for the types of motion involved will be provided between the force sensors FS1 to FS6 and respective actuator means such as AM1 to AM6 embodied in the apparatus being controlled, as exemplified in FIG. 5. For example, in the case of a manipulator arm, actuator AM1 may relate to a horizontal wrist pivot in such arm that regulates a pitch attitude for a hand embodied in the arm. An actuator AM2 may relate to a rotary actuator for turning a manipulator arm hand about the longitudinal axis passing through the hand. The actuator AM3 of FIG. 5 may relate to a normally vertical axis perpendicular to the longitudinal axis of the manipulator arm and the actuator AM4 may relate to such as a horizontal shoulder pivot and elbow point actuators embodied in the arm to effect vertical movement about horizontal axes. The actuator AM5 of FIG. 5 for effecting lateral movement may relate to a rotating actuator affiliated with a vertical axis in a manipulator arm shoulder region and the actuator AM6 for longitudinal movement may relate to horizontal axes affiliated with the shoulder, elbow and wrist portions of a manipulator arm. Otherwise, one or more of these actuators AM1 to AM6 also might relate to control surfaces and thrusters on an underwater or aircraft vehicle. It will be apparent that in the block diagram of FIG. 5, the boxes entitled "PITCH", "ROLL", "YAW", "VERTICAL", "LATERAL" and "LONGITUDINAL" each accepts signals from all of the force sensors FS1 to FS6 in the hand controller of the present invention and analyzes same according to the motions that the respective function blocks are to perform and generate suitable control signals for the motions within the device to be performed by respective actuators there. Basically this is considered in the art as coordinate transformation.

While the foregoing describes what at present is considered to be a preferred embodiment of the invention, it will be appreciated that, for example, the construction of the force sensors can vary with regard to the manner in which yieldability is afforded to the device to permit pick-off of longitudinal forces applied to same. For example, in place of the elastic material 24 shown in FIG. 4, different metallic spring arrangements can be substituted. An obvious different way of arranging elastic material also can be substituted for the particular configuration exemplified in FIG. 4. It also is possible to substitute a different form of sensor means other than the variable reluctance coil-slug arrangement exemplified in FIG. 4. For example, a sensor means of the solid state type or others may be found suitable for measuring the longitudinal forces applied to the forces sensors. In other regards it will be apparent also that the particular shape of the handle and base members 14 and 15 may readily be changed without departing from the truss-like array of transducers interconnecting such members in accord with the basic concept of applicant's invention.

Furthermore, additional finger or thumb operated transducer means 41 and 42 can be added to the handle 10 for accomodation of additional control functions.

I claim:
1. A hand controller comprising,
   a handle adapted to accept a grip of an operator's hand,
   a handle member attached to such handle,
   a base member anchored relative to said handle member, and
   an array of force sensors in direct-supporting interconnection between said handle member and said base member.
2. The hand controller of claim 1, wherein said array of force sensors consists of three pairs of force sensors in hexagonal array.
3. The hand controller of claim 2, wherein the aforesaid handle and base members are in the form of equilateral triangles to the apex corners of which the ends of force sensor pairs are connected.
4. The hand controller of claim 1, wherein each force sensor includes ends secured to the aforesaid handle and base members said ends being yieldable in flexure while relatively stiff in thrust, and a signal-producing transducer means responsive to slight relative longitudinal movements between such ends.
5. The hand controller of claim 1, further including means for transforming coordinate-related signal information generated by said array of force sensors into corresponding coordinate-related control signals for motion and force inducing apparatus.

* * * * *